United States Patent
Meding (12)

(10) Patent No.: US 6,647,156 B1
(45) Date of Patent: Nov. 11, 2003

(54) DATA RETRIEVAL METHOD AND APPARATUS

(75) Inventor: Uwe Meding, Allen, TX (US)

(73) Assignee: ChipData, Inc., Richardson, TX (US)

( * ) Notice: Subject to any disclaimer, the term of this patent is extended or adjusted under 35 U.S.C. 154(b) by 658 days.

(21) Appl. No.: 09/593,240

(22) Filed: Jun. 14, 2000

(51) Int. Cl.[7] .............................. G06K 9/54; G06K 9/60
(52) U.S. Cl. ........................................... 382/305; 707/3
(58) Field of Search ................................. 382/305, 180, 382/282, 100; 707/3, 4; 715/517, 520; 345/629

(56) References Cited

U.S. PATENT DOCUMENTS

| | | | |
|---|---|---|---|
| 6,396,951 B1 * | 5/2002 | Grefenstette | 704/2 |
| 6,445,834 B1 * | 9/2002 | Rising, III | 382/305 |
| 6,535,652 B2 * | 3/2003 | Nakatsuka | 382/305 |

* cited by examiner

Primary Examiner—Phuoc Tran
(74) Attorney, Agent, or Firm—Carr LLP (57) ABSTRACT

Disclosed is an apparatus for and a method of retrieving data from a displayed source document and displaying a listing of segments of text, accompanying data located in the source document, as a result of a given query in a displayed results document. The portion of the source document, from which a given listing is retrieved, can be selected for display from the results document. Material to be transferred to a displayed destination document may be selected from either the source or the results document. The destination document will typically be of a different format than the source document. Editing of the transferred material may be performed in the destination document. Further, a review of the listing of material in the results document from which inserted material was selected may be obtained while that portion of the destination document is being examined. A "best guess" algorithm may be used to automatically fill at least some of the fields of the destination document from the source document for later review and editing by a user.

19 Claims, 5 Drawing Sheets

| Pin Table 4 | | EDIT |
|---|---|---|
| Generic_Part_Name | TSB21LV03B1 | EDIT |
| PackList_1 | PM | EDIT |
| PackList_2 | | EDIT |
| PackList_3 | | EDIT |
| PackList_4 | | EDIT |

*FIG. 6* description continued — 16

60

The midpoint of the pair of resistors that is directly connected to the twisted-pair A (TPA) |package terminals| is connected to the TPBIAS voltage terminal. The midpoint of the pair of resistors that is directly connected to the twisted-pair B (TPB) package terminals is coupled to ground through a parallel RC network with recommended resistor and capacitor values of 5KΩ and 250 pF respectively. The values of the external resistors are designed to meet the draft standard specifications when connected in parallel with the internal receiver circuits and are shown in Figure 3.

62 page 2

*FIG. 7*

Search  [pP]ackage.*[tT]erminal

⦿ Regexp    Vicinity  20 ▼

[Find Next]   [Cancel]   [Help]

DATA RETRIEVAL METHOD AND APPARATUS

TECHNICAL FIELD

The present invention relates in general to retrieving selectable data, from a visual display program source document, in response to one or more queries, for insertion into a different format destination document.

BACKGROUND

Most manufacturers or suppliers of goods and products provide specification sheets providing detailed information about the product. In many instances, the specification sheets are generated in a visual display file format. One popular format is a PDF (portable document format) file. Such a format is often used for display on computer terminals and easy transmission of data from point-to-point via an email attachment or a similar computer network transmission mode. In the case of electronic components, the amount of material contained in a single specification sheet(s) can amount to more than 100 pages of text, charts, tables, diagrams, and graphs.

When the amount of information is voluminous, finding the specific information desired can be very time consuming. As an example, a given set of specification sheets may cover a plurality of chips A, B and C that perform similar, but not identical, functions and have the same pin configurations. Chip A may further be designed to military environmental standards, while chips B and C have lesser requirements. Further, some pins on chips A and B may provide different signals and have different pin labels than similarly positioned pins on chip C. While a large majority of the information for these three chips may be identical, a query pertaining to operating temperature would be likely to retrieve a minimum of three sets of information for maximum operating temperature for the three different chips. It is further likely that there would be data in the sheets on minimum operating temperature. It is also possible that different types of heat sinks and/or air movement conditions would be mentioned in conjunction with operating temperature data. Thus, finding the appropriate data to be retrieved for a given chip may involve considerable amount of time in the perusal of the set of specification sheets.

In the past, the extraction of text from specification sheets has typically been accomplished by manual retyping from an original or copy of that specification sheet(s). Another method has been to display the material on a computer screen and select, copy and paste material from a source document to a destination document. While the last mentioned approach has, in some cases, been more accurate than retyping, the pasted material in the destination document requires considerable modification and reorganization and is often slower than retyping in the first place. Further, the correct material must be found in the voluminous material of the source document. Thus, the manual search, select, copy, and paste method is still so labor intensive it is seldom used.

To visually display information on a computer screen, some programs insert text, data and graphics characters and symbols into non-visible receptacles or containers. These containers or receptacles may then be axially oriented and positioned on the screen to display the information to be presented. An example of one such visual display program file is typically referred to as a PDF (portable document format) file. The process of retrieving data, and in particular decomposed data, from a PDF file is shown in more detail in a co-pending patent application, serial number 09/594052, filed on the same day as this application, assigned to the same assignee as the present invention, and entitled DATA MERGE AND EXTRACTION METHOD AND APPARATUS.

To accomplish the retrieval of data from a PDF format specification sheet, it would thus be desirable to have a program or process where a user may select a visual display source file, display the contents visually in a first window, be able to query the source file for all occurrences of a given type of data and to have displayed in a second window a listing of the data found that corresponds to the query. A determination as to which one of the sets of retrieved data in the list is appropriate would be facilitated if the listing further included text in close proximity to the specific word or phrase data matching the query. The ability to quickly find and view the portion of the source document that corresponds to a given set of data in the list would also minimize the time necessary to make the determination of the correct set of data. Once a determination is made that the correct data has been found, it would be desirable that the material, selected as appropriate, be transferable from either the source document or the retrieved list for placement in a destination document of a different format from that of the source without further typing. It would further be desirable to be able to edit the transferred material in the destination document, either in a third window or additional windows.

It would also be desirable to be able to formulate a list of standardized queries that, when acted upon by an extraction program, would generate a destination document in accordance with a predetermined format with data, retrieved from a selected source document, already inserted on a "best programmed guess" basis. In such a situation, it would then be desirable to be able to, from the destination document, obtain a displayed view of the portion of the source document from which data was retrieved for any specific category of data inserted. It would also be desirable to review a listing of the query results (pre-mined data) from which the data was selected from the destination document.

Since the specification sheets cannot always be obtained in a visually displayable format, whether PDF or some other format, they may have to be reproduced in a computer using OCR (optical character reader) scanning techniques. The resulting displayed source document, depending upon the specific OCR technology used, may be straight text or may use containerized text techniques similar to the PDF files mentioned above. Thus, it would be desirable to be able to accomplish the retrieval of text from source documents of various formats in the manner described above.

SUMMARY

The present invention comprises an apparatus for and a method of retrieving data from a displayed source document and displaying a listing of segments of text accompanying data located in and batch queried from the source document to facilitate the action of inserting pertinent data in a differently formatted destination document.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
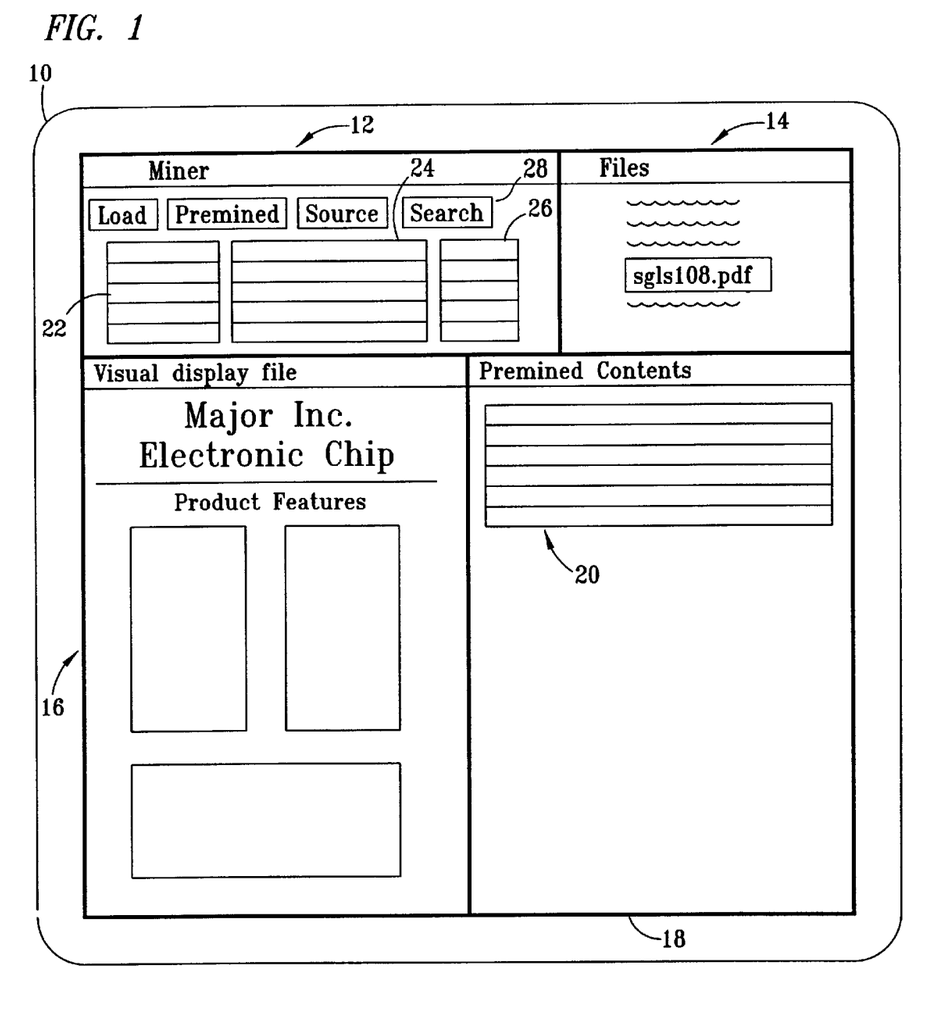
FIG. 1 is a representation of a computer monitor display.
Figure 7:
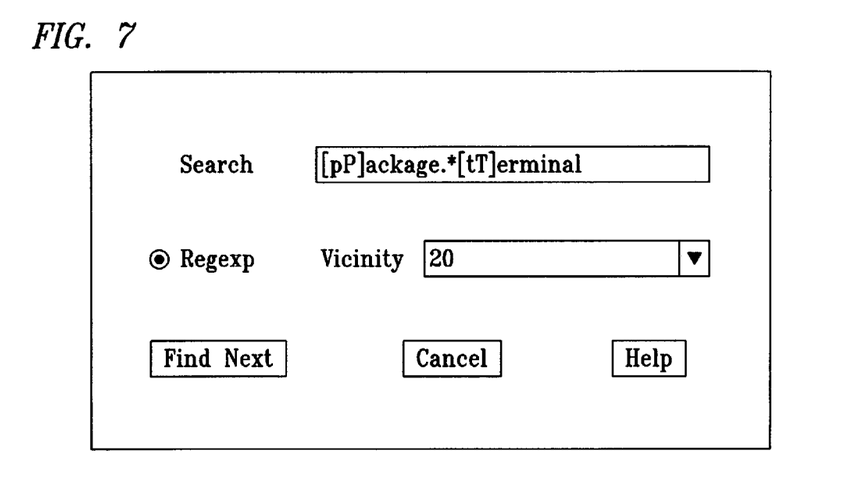
FIG. 7 presents a likeness of a search window for manually forming a query to a search engine portion of the program.
Figure 8:
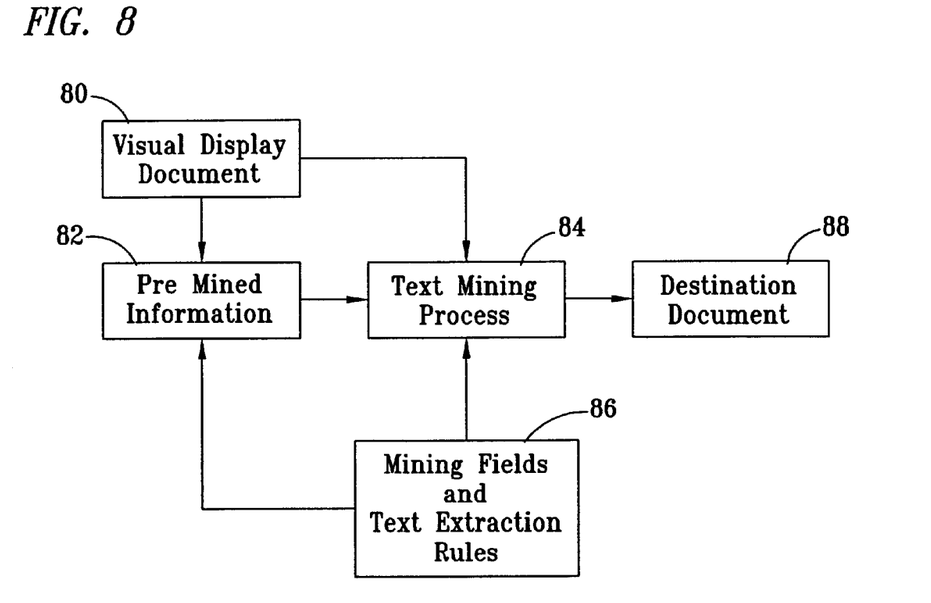
FIG. 8 comprises a flow diagram of the process involved in providing the display of FIG. 1.
Figure 9:
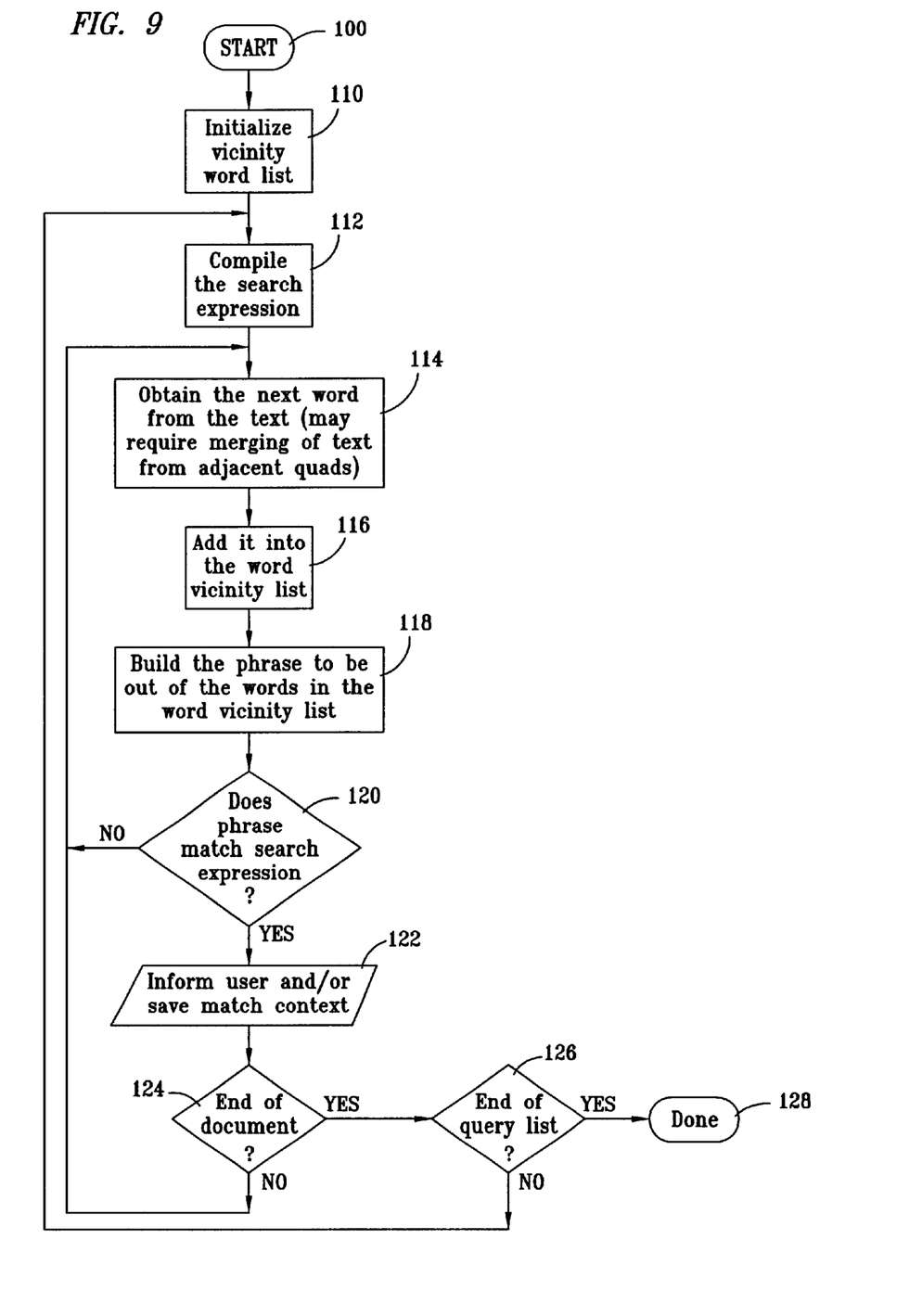
FIG. 9 comprises a flow diagram of the process involved in providing the search function used in generating the pre-mined data of block 18 in FIG. 1.

In the drawings, FIGS. 2–9 are used to explain in more detail the operation of the invention typically having a display similar to that shown in FIG. 1. First, a generalized operational description will be provided with reference to FIG. 1, and then specific illustrative details will be discussed with reference to FIGS. 2–7, as examples of programming details addressed in performing the present invention. FIGS. 8 and 9 provide additional insight into the process used in a preferred embodiment of the invention.

The term "best guess," as applied to programming software herein, comprises a more likely correct term from a set of possible terms retrieved from a document based upon past experience with previously examined documents as prepared by a given manufacturer. As an example, the term most likely to be the correct term may be based on relative position in a document or the position of the most likely correct term relative to some other term in a document.

In FIG. 1, four windows, or information display areas, are shown on a screen of a computer system monitor 10. One of these windows is labeled "Miner" and is further designated as 12. This window 12 presents material included in a generated destination document for data selected in or extracted from a source visual display file. A second window 14 is further labeled "Files." A third window 16 is further labeled "Visual Display File" while a fourth window 18 is labeled "Pre-mined Contents." The contents of each of these windows will be discussed in more detail later.

The information display areas of FIG. 1 may, alternatively, be. successively accessed in computer systems lacking the present day multiple window display capability. The most recent computer systems readily permit the display windows to be shown and accessed on multiple monitors. The manner in which data retrieval and editing occurs, therefore, may be a function of the resources of the computer system, including the operating system type and versatility of the display program.

For now, it may be noted that the window 16 comprises the source document visual display file as selected from a list of possible files in window 14. Such loading of the file may be made to occur by actuating a "Load" button in window 12 after the appropriate file-name is highlighted in window 14. The first time the file of window 16 is loaded, a data extraction program is started and data meeting specific queries is placed in a further file. This further file may be designated as "Pre-mined" data, or as a result file. Window 18 is used to display the pre-mined data, as set forth in a plurality of fields 20. The data in fields 20 may be induced to correspond to a selected category in a plurality of titles set forth in block 22 in window 12 by selecting the "Pre-mined" button in block 12 after selecting the appropriate category set forth in block 22. The source display in block 16 may also be induced to display the portion of the source document containing the data displayed in the destination document by first selecting the category in block 22 and then selecting the button labeled "SOURCE." The document containing the data in fields 20 not only contains the extracted data displayed, but also comprises indexing type information as to where in the source document of block 16 the data was found. When the document displayed in window 16 comprises more than one display window in length, the selection of a given set of data within the block of fields 20 will cause the window 16 to display the portion of the document from which that material was extracted as a result of the indexing data. The user may then examine both the source of extracted data in window 16 and the extracted or pre-mined data in window 18 to determine if this is the correct data to be inserted into the destination document of window 12. When the appropriate data is found, a highlighting selection of that data will cause it to be inserted into one of a set of fields in block 24 corresponding to the category previously selected in block 22. Editing of the inserted material may then be performed by actuation of an edit button within block 26. Search button 28 may be actuated to provide a manually composed search criterion in the event that the pre-programmed search does not retrieve the correct pre-mined data for a given category in window 18 for a given source document.

In some instances, the data placement in the specification sheets of a given manufacturer may be predictable enough that a "best guess" algorithm may be used to select all or part of the data from the source document to be placed in the categorized fields of block 24. Since these fields are reviewable and editable by the user, the computer algorithm inserted material may be altered where appropriate and still result in a significant user time reduction, as compared to having the user select all the material for insertion into the destination document.

Figure 3:
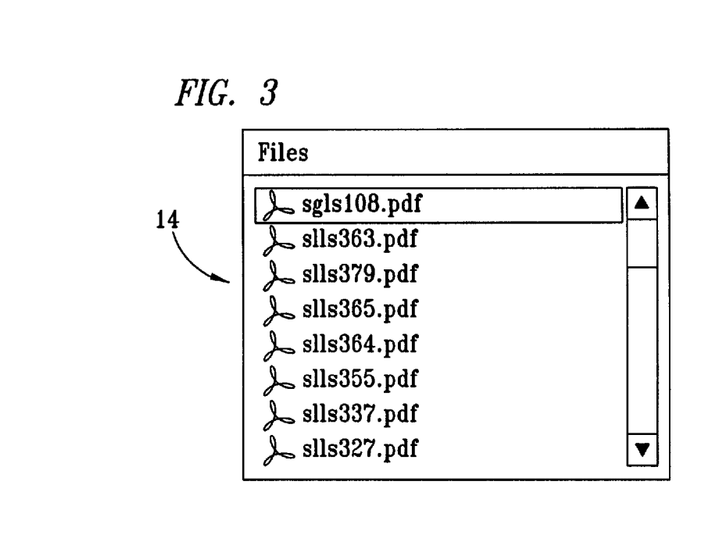
FIG. 3 provides a more detailed view of a files window portion of FIG. 1.

FIG. 3 shows the files window block 14 in more detailed format with a file "sgls108.pdf" highlighted. The "pdf" portion of the file name indicates that it is in a well-known portable document format and, further, that it is a visual display file. Once this file is selected, it may be accessed or processed to display in window block 16 by any of several actions, including actuating the button labeled "Load" in window block 12 of FIG. 1. Typically, the first page of the file is then displayed in block 16. As mentioned above, while the preferred embodiment was designed specifically to accommodate the very commonly occurring PDF files, the data extraction program examines the format of the source file selected and adjusts the way in which data extraction occurs to accommodate the specific format of the source file selected. Thus, the invention may utilize many different formats, including standard text files, as a source of data.

Figure 2:
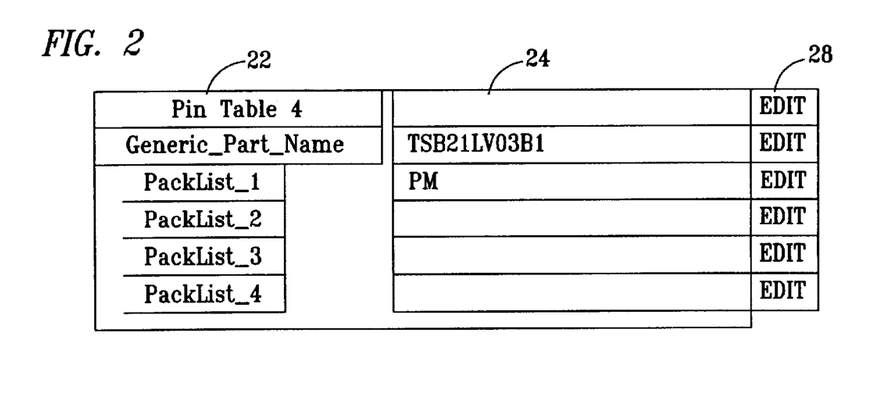
FIG. 2 provides a more detailed view of a portion of a destination document window of FIG. 1.

When the visual display file is loaded for the first time, a query document is started to retrieve data relating to all instances of occurrence of certain words contained in each of a plurality of queries. A listing is generated of all data found adjacent (or in the vicinity of) "found" words. This listing includes where the data was found. This listing is contained in a pre-mined contents document. The portion of this pre-mined contents document relating to a given category is presented in the window of block 18, such as shown in detail in FIG. 5, when a given category, such as "Packlist 1" shown in FIG. 2, is selected. When the visual display file is loaded on subsequent occasions, a finding of an associated pre-mined contents file negates the data retrieval action of the query document and, thus, any "best guess" algorithm insertion of data into the destination document.

A significant purpose of the present invention is to simplify the accurate insertion of data into a destination document. Thus, the use of a standardized batch query document for all visual display files of a given manufacturer to visually display all occurrences of given words or phrases in a document significantly reduces the time necessary to find data to be inserted into a destination document.

Figure 4:
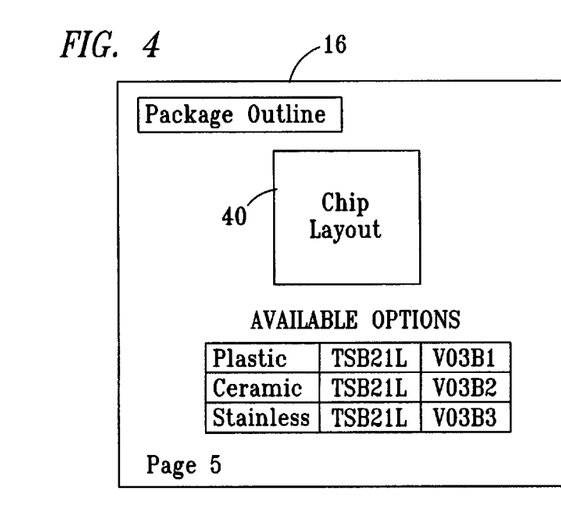
FIG. 4 provides a more detailed view of one page of a visual display source document window portion of FIG. 1.

As an example of a query, it may be known that a given manufacturer always places a list of part names adjacent the words "AVAILABLE OPTIONS." When the portion of block 22 entitled "Generic Part Name" is selected, the words AVAILABLE OPTIONS, as well as some adjacent words, would appear in the pre-mined text block 20 of FIG. 1. The location data associated with this text in the pre-mined text document would then cause the appropriate part of the source document to be displayed. An example is shown in FIG. 4 where a presentation is provided showing that there are various types of parts having a common chip layout of pins and pin numbers on page 5 of the source document. If the portion of this page containing TSB21LV03B1 is selected, this material will be inserted into the destination document in the manner shown in a portion of block 24 adjacent the label "Generic Part Name" in FIG. 2.

Figure 5:
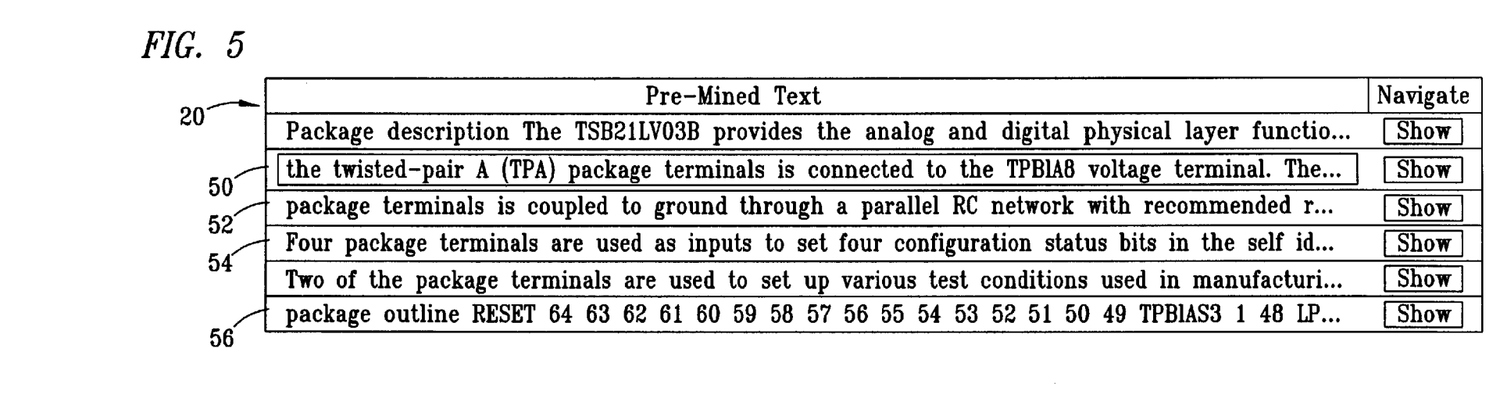
FIG. 5 provides a more detailed view of a portion of a pre-mined text document window of FIG. 1.
Figure 6:
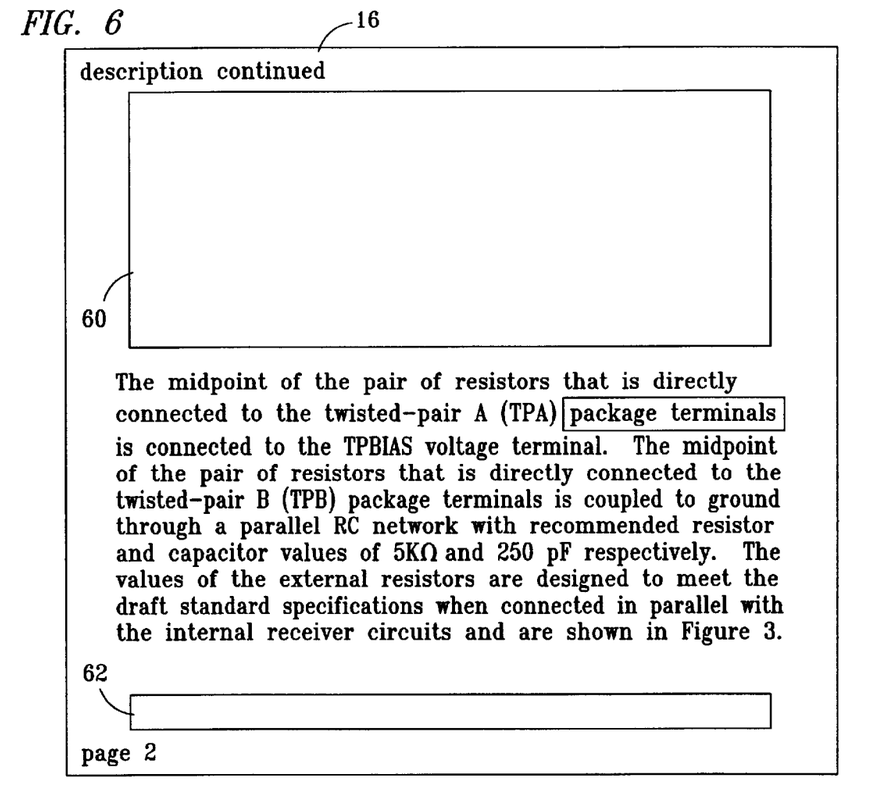
FIG. 6 provides a more detailed view of a second page of the visual display source document window portion of FIG. 1.

As a continuation of the above, the label "Packlist 1" may be associated with the query of all instances of "Package" or "package." The pre-mined text shown in FIG. 5 may be found as a result of this query. The second line of block 20 in FIG. 5 is designated as 50 and is shown highlighted. This line 50 starts with the words "the twisted-pair." The selection of the "Show" button to the right of this text will cause the display in block 16 to present the material on page 2, as set forth in FIG. 6. In this figure, blocks 60 and 62 represent other displayed text on page 2 not pertinent to this discussion and, thus, not presented in detail.

The word "package" is highlighted on this display, as well as the following word "terminals," to provide a highly visible indication of where on page 2 the text was found. It may be noted that the material on line 52 of block 20 in FIG. 5 is located in the next sentence of the material illustrated in FIG. 6. Thus, if the "Show" button in line 52 were selected, the display in FIG. 6 would remain as shown, except that the highlighted material would move down 4 lines. It should also be noted that a line of text 56 refers to the material in FIG. 4 starting with the phrase "package outline" at the top of the display and continuing with material that would be next retrieved from the pin labels and numbers in block 40 further labeled "chip layout." The editable field in block 24 of FIG. 2 next to the label "Packlist 1" shows that "PM" has been inserted or edited by choice of the user of the system. The user is not bound by the data extracted in the pre-mined text of the results document, but may actuate the edit button and key in any appropriate terms. Alternatively, the user may copy and paste any appropriate material from the source document found through subsequent searching of the source document.

If the data returned by the batch query document is inadequate for a specific category, a manually formulated search may be initiated. In one embodiment of this invention, this was accomplished by selecting the search button block 28 of FIG. 1. Such an action may produce a search window, such as shown in FIG. 7. In a search example illustrated, the "Search" field may be completed with the phrase "[pP]ackage.* [tT]erminals." In the programming language used in one embodiment of the invention, the "." indicates any character may follow the word "package" and the "*" indicates that any number of words may occur between the words "package" and "terminals." The "[pP]" signifies that the word "package" may start with either a capital or lower case "p." The Vicinity Field data shown causes the search to cover a continuously shifting set of 20 words proceeding through the source document. The down arrow to the right of the vicinity field signifies that other standard vicinity values may be selected from a list. The Regular Expression (Regexp) button determines whether the search is conducted for the exact phrase shown in the Search field or the programming equivalent, as explained above. As shown, the Regexp button is activated, thus the search would be for a phrase commencing with "[pP]ackage" rather than the programming equivalent of upper or lower case.

The flow diagram of FIG. 8 summarizes the discussion above as to the operation of the various parts of the invention in transferring selected types of data from a visual display source document to a destination document. As illustrated, data is transferred from a visual display document represented by block 80 to a pre-mined information or results document as shown in block 82, and also to a text mining process block 84. The fields mined and the rules or filtering operations used in retrieving the data are set up in accordance with block 86 which operates to control the original batch mining process occurring in block 82, as well as subsequent selection or mining processes, as set forth in block 84. When the data is selected, either from the visual display document of block 80 or from the pre-mined document of block 82, it is transferred through block 84 to a destination document referred to in block 88.

The flow diagram of FIG. 9 illustrates the steps used in a preferred embodiment of the invention to perform the search through the source visual display document presented in block 16 of FIG. 1. After commencing in start block 100, the query document is examined, as part of an initialize block 110, to determine what number of consecutively occurring words should be examined during the search. At this time, a structure is built in the computer memory that operates in the manner of a shift register for words. In operation, as each new word is entered in the front of the shift register, the oldest or longest stored word in the register is dropped. As part of the preparation of retrieving words from a visual display document, parts of decomposed words will often have to be reassembled from separate but adjacent character containers in a process similar or identical to that described in my referenced co-pending patent application. Once a vicinity word list mechanism is created, a search expression is compiled from the query document, as shown in block 112. Then, in blocks 114, 116 and 118, another word is retrieved from the source document of block 16, added to the shift register mechanism or vicinity list of words to create a new phrase. In decision block 120, the newly established phrase is checked against the search expression compiled in block 112. If it does not match, the process returns to block 114 to fetch the next word. If it does match, and the process is in the batch mode of queries, the phrase is saved to the pre-mined text document of block 18, as stated in block 122. If the process is part of the manual search mode described in conjunction with the search button 28 and FIG. 7, the user is also informed of the results. Decision block 124 is then entered to ascertain if the end of the document being searched has been reached. If not, a return to block 114 occurs. If it is the end of the source document, a check is made in decision block 126 to see if all the queries have been acted upon when the process is in the batch mode. If not, the next query expression is compiled in block 112. If, on the other hand, the list of queries has been completed, the process enters the "Done" block 128.

Figure 10:
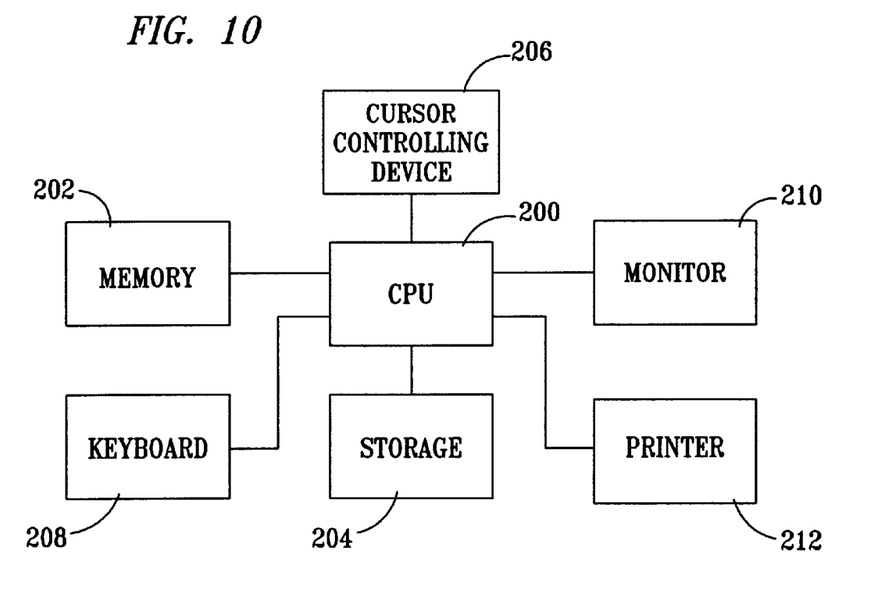
FIG. 10 illustrates a computer system that may be used to practice the present invention.

In FIG. 10, a CPU 200 is illustrated having internal or external memory 202 and data storage 204. Storage apparatus 204 may comprise both internal and removable storage means. Such removable storage may be used to install programs and to transfer output or destination data files generated as a result of using this invention to other devices. The CPU 200 is shown being further connected to a cursor controlling device 206, such as a mouse, trackball and so forth. The CPU 200 is further connected to a keyboard 208, a monitor(s) 210 and a printer 212 for entering commands, viewing file contents and program results and printing output, respectively. The various source, second or pre-mined and destination documents along the process program are stored in memory 202 and/or in data storage 204. The one or more monitor(s) 210 is used to display the multiplicity of windows shown in the drawings for retrieving and displaying source documents, as well as for displaying the second and destination documents. The cursor controlling device may be used to select material from the windows displaying the source and pre-mined on monitor(s) 210 for copying and pasting into the destination document. Alternatively, the material in the fields of the destination document may be keyed in from the keyboard 208, if this is more efficient than the copy/paste method.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is, therefore, contemplated that the claims will cover any such modifications or embodiments that fall within the true scope and spirit of the invention.

What is claimed is:

1. A method of extracting data from a visual display document program, comprising the steps of:
   displaying at least a portion of a source document from which data is to be extracted;
   displaying a results document;
   formulating a query for data to be retrieved;
   sending text, satisfying the query and found in said displayed source document, to said results document; and
   selecting text, from information gleaned from said results document, for use in a destination document.

2. The method of claim 1, comprising the additional steps of:
   displaying said destination document; and
   selecting the text to be placed in the destination document from either said source document or the destination document.

3. The method of claim 1, comprising the additional step of:
   providing a means by which, from said destination document, the source document can be induced to display a portion of the source document from which a given result text was retrieved.

4. The method of claim 1, comprising the additional step of:
   providing a means by which, from said results document, the source document can be induced to display a portion of the source document from which a given result text was retrieved.

5. The method of claim 1, wherein some words in the source document are decomposed into multiple character set containers, comprising the additional step of:
   merging character sets in adjacent containers, having the same character orientation and being separated by no greater than a predetermined distance on a display, to form complete words sending text to said results document.

6. The method of claim 1, wherein the source document is generated in accordance with PDF (portable document format) standards and the results document is generated in accordance with a standard other than PDF, comprising the additional steps of:
   merging source document characters from adjacent quads that visually appear on the display to be a single word before sending the words to said results document; and
   displaying a destination document simultaneously with the source and results document.

7. The method of claim 1, wherein the source document is encrypted to decompose at least some words into multiple character set containers, comprising the additional step of:
   decrypting the source document by merging character sets in adjacent containers, having the same character orientation and being separated by no greater than a predetermined distance on the display, to form complete words before displaying same in the results document.

8. The method of claim 1, comprising the additional steps of:
   retrieving words from the source document in the same order as a document would normally be read for the language in which the document is written; and
   setting the number of adjacent words that are to be examined as a group before executing the data retrieval formulated by the query.

9. Apparatus for extracting data from a visual display document program, comprising:
   computer system means including display means;
   means for presenting on said display means at least a portion of a source document from which data is to be extracted;
   means for presenting on said display means a results document;
   means for formulating a query of data to be retrieved;
   means for sending text, satisfying the data query and found in said displayed source document, to said results document; and
   means for selecting text, from one of said source and results document, for use in a destination document.

10. A method of retrieving selected types of data from a visual display source document file, comprising the steps of:
   compiling a list of key words and phrases to be searched for in a source document file;
   searching the file for each occurrence of the key words and phrases contained in said list;
   keeping a record of where each searched for key word and phrase is found in the file;
   retrieving sets of text containing each key word and phrase in accordance with a predetermined set of conditions;

arranging the retrieved sets of text in a predetermined order and format; and generating a visually displayable result document file, including the retrieved sets of text, as previously arranged.

11. The method of claim 10, comprising the additional step of:

displaying, at any given time, only the sets of text retrieved in response to a search for one of the items in said list of key words and phrases.

12. A method of facilitating the generation of a destination document comprising predetermined types of data contained in a visually displayable source document, comprising the steps of:

creating a search results document containing a plurality of sets of text found in a visually displayable source document wherein each set includes a word satisfying at least one search condition;

simultaneously displaying source, search results and destination documents; and transferring selected text from one said source and search results document to a selected portion of said destination document.

13. The method of claim 12, comprising the additional steps of:

causing the source document display to text synchronize with a given set of text in the results document upon command from the results document display; and highlighting the searched-for word in the source document display.

14. The method of claim 12, comprising the additional step of:

causing the source document display to text synchronize with a given set of text in the destination document upon command from the destination document display.

15. The method of claim 12, comprising the additional step of:

causing the results document display to show pre-mined text corresponding to a selected category in the destination document upon command from the destination document display.

16. The method of claim 12, comprising the additional step of:

using a best guess algorithm to select text to be transferred from said source document to editable fields of said destination document for review and editing by a user.

17. Apparatus for generating a destination document comprising predetermined types of data contained in a visually displayable source document, comprising:

computer system means including display means;

means for creating a search results document containing a plurality of sets of text found in a visually displayable source document wherein each set includes a word satisfying at least one search condition;

means for simultaneously displaying source, search results and destination documents on said display means; and means for transferring selected text from one said source and search results document to a selected portion of said destination document.

18. A method of accurately generating an output document comprising selected material retrieved from a source PDF (portable document format) file, comprising the steps of:

compiling a list of key words and phrases;

searching the file for each occurrence of the key words and phrases contained in said list;

keeping a record of where each key word and phrase is found in the file;

retrieving the entire sentence, paragraph or line containing each key word and phrase in accordance with a predetermined set of conditions;

generating a first window for displaying the contents of the source PDF file;

generating a second window for displaying a list of the retrieved text;

arranging the retrieved sentences, paragraphs and lines of text in a predetermined order and format; and generating a visually displayable destination document file including at least portions of the retrieved sentences, paragraphs and lines of text, as previously arranged, for display in a third window.

19. The method of claim 18, comprising the additional step of:

changing the display in said first window to display a portion of said source PDF file from which text was retrieved upon command from either of said second and third windows.

* * * * *